May 19, 1936. H. F. JOHNSON 2,041,132
PIPE COUPLING
Filed Oct. 19, 1932 2 Sheets-Sheet 2

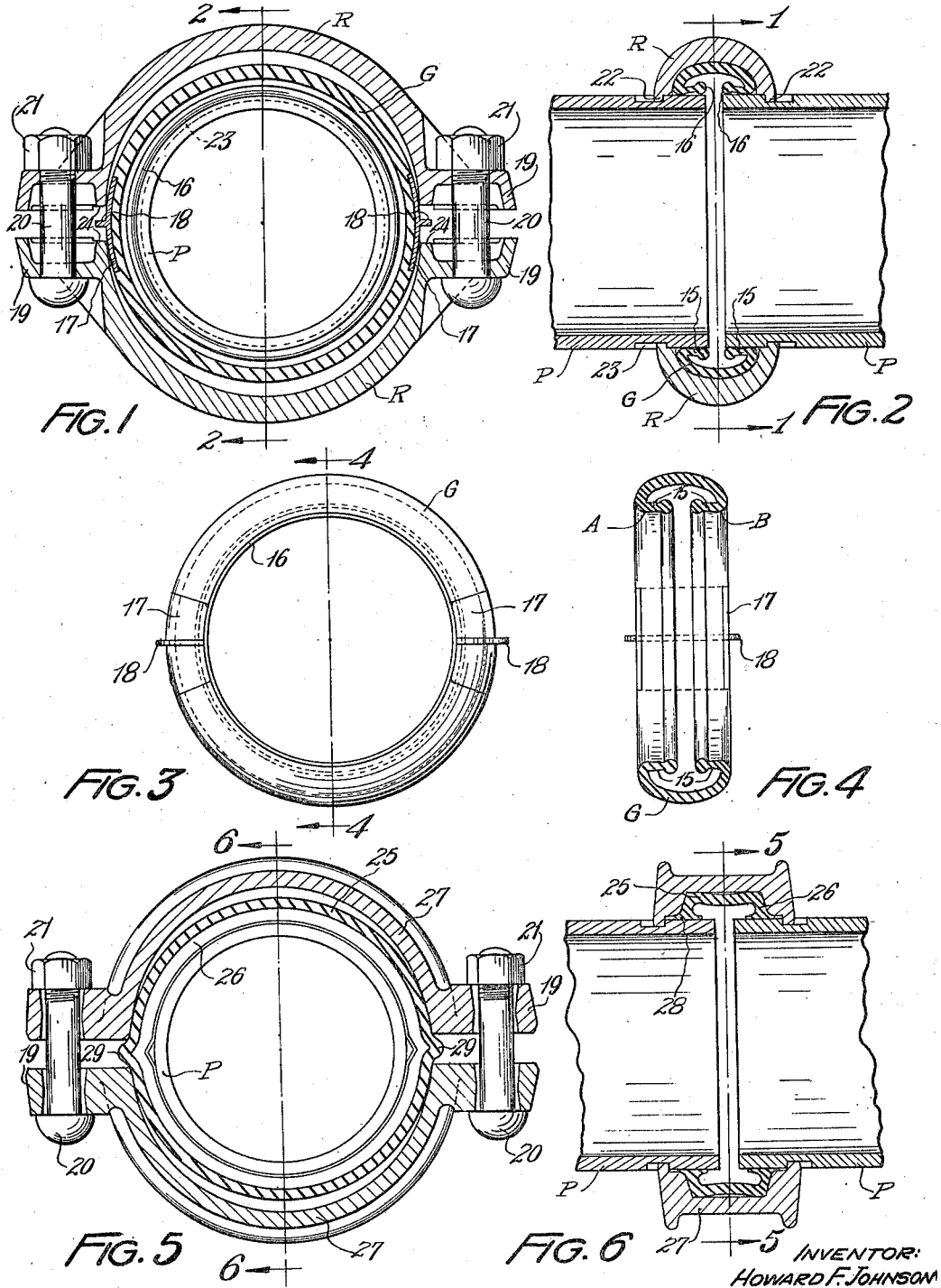

INVENTOR:
HOWARD F. JOHNSON
Kwis Hudson & Kent
ATTORNEYS

Patented May 19, 1936

2,041,132

UNITED STATES PATENT OFFICE 2,041,132

PIPE COUPLING

Howard F. Johnson, Cleveland, Ohio, assignor to The Champion Machine and Forging Company, Cleveland, Ohio, a corporation of Ohio Application October 19, 1932, Serial No. 638,590

2 Claims. (Cl. 285—194)

This invention relates to a pipe coupling such as is used to join together and seal the adjacent ends of the pipe lengths or sections of a pipe line. The pipe coupling embraced by the present invention is especially adapted for use upon high pressure pipe lines, although it should be understood that it functions efficiently upon low pressure or other forms of pipe lines.

An object of the invention is to provide a pipe coupling wherein the flexible ring or gasket and the retaining ring are formed with a novel configuration facilitating the application of the coupling to the pipe sections of a pipe line, enabling the flexible ring or gasket to adapt itself to the internal space of the retaining ring without distortion, and eliminating pinching or cutting of the flexible ring or gasket by the retaining ring and thus increasing its life.

Another object is to provide in a pipe coupling a flexible ring or gasket which is provided with means for properly locating the retaining ring with respect to the gasket, for maintaining the flexible ring or gasket against bodily movement relative to the retaining ring, and for reinforcing and protecting the gasket at those points where it is subjected to strain and wear.

Another object is to provide in a pipe coupling improved means for preventing separation or longitudinal movement of the pipe sections with respect to the retaining ring of the coupling, while permitting expansion and contraction of the pipe sections due to temperature changes.

A further object is to provide a pipe coupling for use upon light gauge pipes which cooperates with the pipe sections in a manner adequately preventing separation or longitudinal movement of the sections, but permitting expansion and contraction thereof due to temperature changes.

Additional and further objects and advantages inherent in the present invention will become apparent during the following description of several embodiments thereof.

The embodiments of the invention to be described herein are illustrated in the accompanying drawings, wherein:

Figure 1 is a sectional view extending transversely through a pipe line with a pipe coupling embodying the invention arranged thereon and is taken substantially on line 1—1 of Fig. 2, looking in the direction of the arrows, the retaining ring of the coupling being shown in a position other than its fully assembled position;

Fig. 2 is a sectional view extending longitudinally of a pipe line with the pipe coupling arranged thereon and is taken substantially on line 2—2 of Fig. 1, looking in the direction of the arrows, the retaining ring being shown in the fully assembled position;

Fig. 3 is a detailed elevational view of the flexible ring or gasket of the coupling shown in Figs. 1 and 2;

Fig. 4 is a sectional view of the flexible ring or gasket taken substantially on line 4—4 of Fig. 3, looking in the direction of the arrows;

Figure 7:
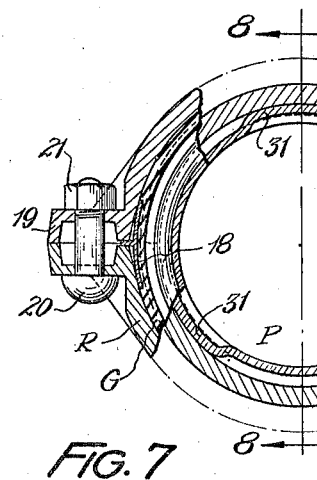
Figure 8:
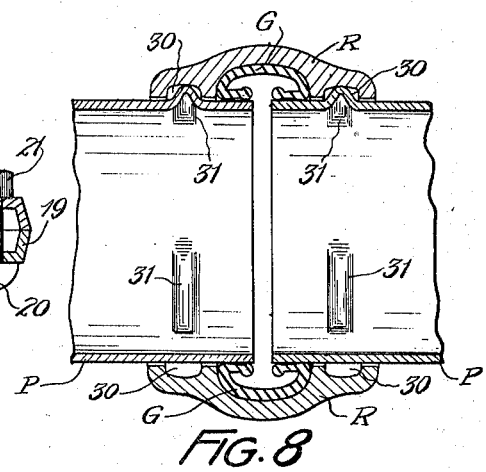
Figure 9:
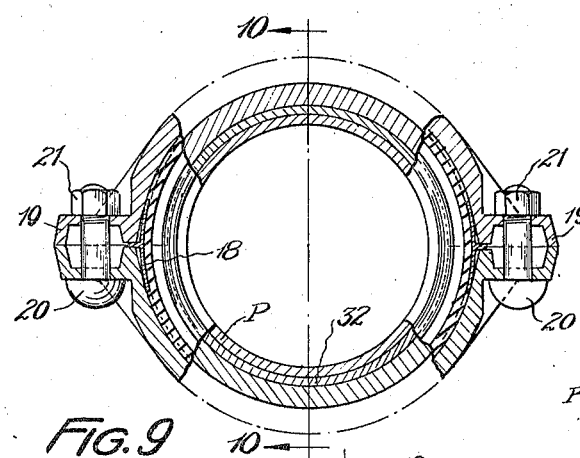
Figure 10:
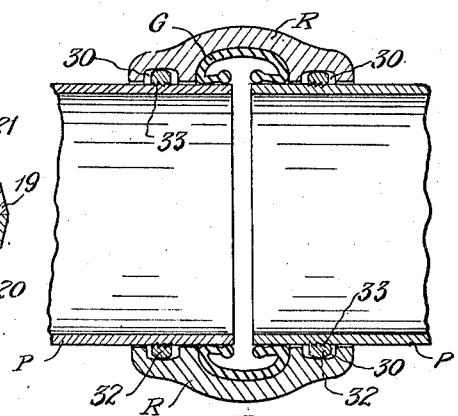
Figure 11:
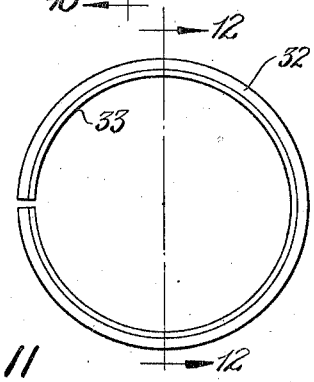
Figure 12:
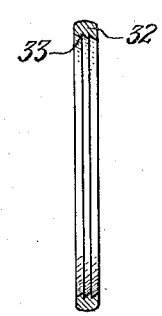

Figs. 5 and 6 illustrate a conventional form of pipe coupling construction over which the present invention is an improvement; Fig. 5 being a sectional view, extending transversely of the pipe line and similar to Fig. 1, taken substantially on line 5—5 of Fig. 6, looking in the direction of the arrows, while Fig. 6 is a sectional view, extending longitudinally of the pipe line similar to Fig. 2, taken substantially on line 6—6 of Fig. 5, looking in the direction of the arrows;

Fig. 7 is a sectional view taken transversely through a pipe line with a different form of pipe coupling assembled thereon than is shown in Figs. 1 and 2; different portions of said view being taken through different transverse planes to clearly illustrate the construction of the coupling;

Fig. 8 is a sectional view taken substantially on line 8—8 of Fig. 7, looking in the direction of the arrows;

Fig. 9 is a sectional view similar to Fig. 7, but showing a different form of coupling than is illustrated in Figs. 1 and 2 and Figs. 7 and 8;

Fig. 10 is a sectional view taken substantially on line 10—10 of Fig. 9, looking in the direction of the arrows;

Fig. 11 is a detailed elevational view of the locking ring used in the form of coupling shown in Figs. 9 and 10, and Fig. 12 is a sectional view taken substantially on line 12—12 of Fig. 11, looking in the direction of the arrows.

Referring to Figs. 1 to 4, inclusive, the pipe coupling will be seen to include a retaining ring R and a flexible ring or gasket G, the latter being of the type commonly called the "double U type" and is in the form of a cylindrical ring.

The flexible ring or gasket in cross-section is curved or arched in form between the points A and B (see Fig. 4); that is, the gasket is transversely curved or arched from edge to edge thereof or between its opposite circular ends and presents no straight exterior surfaces or sharp edges formed by intersecting exterior straight surfaces, it being noted that the points A and B at which the curvature of the gasket terminates are at the opposite edges or circular ends of the gasket and are located inwardly of the outermost points of the sides of the gasket that is internally of the ring with respect to its maximum transverse width.

Extending inwardly from the opposite edges or circular ends of the gasket and in alignment with each other, are straight flange portions 15 forming a cylindrical bore through the ring or gasket that is of substantially constant diameter from end to end. The flanges 15 extend toward each other a length such that there will be a space between their adjacent inner edges for a purpose later to be explained; said adjacent inner edges of the flanges having formed thereon enlarged reinforcing beads 16 which, as illustrated in the drawings, may be substantially circular in cross-section and project above and below the opposite side surfaces of the flanges 15.

The ring or gasket is formed of rubber or other suitable elastic material it being noted that the portion of the ring between the points A and B is formed of thicker material than are the flanges 15 to give the gasket the requisite strength, but to provide the required flexibility where necessary.

In order to reinforce the flexible ring or gasket G at those points which are subjected to strain and wear and to provide means for centering and properly locating the gasket with respect to the retaining ring R and to prevent rotation or movement of the gasket with respect to said ring, members 17 are provided which are shaped to fit over the outer side of the gasket and to be molded therein and form an integral part thereof, as clearly illustrated in Fig. 1. The members 17 are arranged at diametrically opposite sides of the gasket G and are provided with outwardly or laterally extending ribs or flanges 18. The members 17 are formed of different material than is the gasket, preferably being formed of metal.

The retaining ring R is made in two semi-circular sections from the opposite ends of which laterally extend flanges or lugs 19 which, when the sections of the retaining ring are assembled upon the gasket and the pipe line, are in co-operating relationship with each other and form the means by which the sections may be clamped together by bolts 20 extending through openings in said flanges 19 and having securing nuts 21 screwed upon their threaded ends.

The sections of the retaining ring R have inwardly extending annular flanges 22 located at each end of the retaining ring, such flanges being adapted, when the ring is mounted upon the adjacent ends of pipe sections P of a pipe line, to engage in annular grooves 23 formed exteriorly in the pipe sections adjacent their ends, such grooves being of sufficient width to allow expansion and contraction of the pipe sections under temperature changes. The flanges 22 and grooves 23 are, of course, for the purpose of preventing separation of the pipe sections.

The interior of the retaining ring is transversely curved similarly to the cross-sectional curvature of the gasket between points lying outwardly of the ring with respect to the points A and B to the end that the inner sides of the ring and the exterior of the gasket are substantially or approximately complementary. However, the internal diameter of the ring is slightly less than the external diameter of the gasket.

Each section of the retaining ring is also provided adjacent the flanges 19 with recesses 24 which receive the outwardly extending ribs 18 of the member 17 when the retaining ring is assembled upon the gasket. The engagement between the ribs 18 and the retaining ring prevents relative movement between the gasket and the retaining ring.

In assembling the pipe coupling upon the adjacent ends of pipe sections P of a pipe line, the gasket G which is of a slightly less internal diameter than the external diameter of the pipe sections is stretched sufficiently to allow the end of the pipe sections to be inserted into the cylindrical bore formed by the flanges 15 of the gasket, it being noted that the insertion of the ends of the pipe sections is facilitated by the curvature of the gasket outwardly of the points A and B thereof. The pipe sections are then moved toward each other until their ends are separated the desired distance, such movement of the pipe sections moving the cylindrical flanges 15 inwardly of the gasket so that they are disposed angularly with respect to the pipe sections, the beads 16 being in engagement with the outer surface of the sections.

The retaining ring may now be assembled on the gasket and the pipe sections by positioning the sections of the retaining ring upon the gasket as illustrated in Fig. 1 and then drawing said sections together, to form the complete circular retaining ring, by tightening the nuts 21 on the bolts 20.

Since the internal diameter of the retaining ring is slightly less than the external diameter of the gasket, it will be seen that the gasket must ordinarily either be compressed or deformed to enable it to be accommodated within the retaining ring. However, since the gasket is transversely curved between the points A and B which lie internally of the gasket with respect to its maximum width and the internal shape of the retaining ring is substantially complementary to the transverse curvature of the gasket between points lying outwardly of points A and B or approximately between points lying at the maximum transverse width of the gasket, the application of the retaining ring to the gasket can be accomplished since the gasket will accommodate itself within the ring as there are no interengaging straight surfaces or corners in the ring or upon the gasket to prevent the gasket from so doing.

The gasket, when the retaining ring is applied thereto, adapts itself to the interior space of the ring, the flanges 15 of the gasket being moved toward the ends of the pipe sections or toward each other. Also, since the gasket is curved both transversely and circumferentially, the interior edges of the sections of the retaining ring adjacent the flanges 19 will readily move over and embrace the exterior surface of the gasket with the result that the sections of the retaining ring can be brought to fully assembled position without pinching the ring.

In order to better illustrate the advantages inherent in the novel configuration of the gasket and retaining ring, there is illustrated in Figs. 5 and 6 of the drawings, a pipe coupling wherein the gasket and retaining ring are of conventional configuration. It will be noted that the gasket of this conventional form is provided with a back 25 which in a transverse direction is straight and has extending from its opposite edges outwardly divergent straight side walls 26, which terminate at their ends and adjacent the inwardly directed flanges of the gasket in sharp edges. The retaining ring of this conventional form, indicated in Figs. 5 and 6 at 27 is internally shaped to correspond to the cross-sectional shape of the gasket and is, as is usual, of slightly less internal diameter than the external diameter of the gasket. The result is that when the retaining ring is applied to the gasket the gasket must be deformed in order to be accommodated within the retaining ring, since the flat interengaging surfaces of the ring and gasket and the sharp edges and angles between the flat surfaces of the ring and gasket restrict the movement of the gasket within the ring and cause the back 25 of the gasket to be buckled inwardly, as clearly shown in Fig. 6, at a point adjacent the sectional line 5—5.

It will also be noted that the retaining ring in being applied to the gasket, will cause the outer edge of the side walls 26 of the gasket to be pinched between the retaining ring and the pipe section, as indicated at 28 in Fig. 6, thus damaging the gasket. It will also be realized that, since the back 25 of the gasket is straight in a transverse direction, the ends of the two sections of the retaining ring 27 when brought together by tightening the nuts upon the retaining bolts, tend to pinch the gasket and to force diametrically opposite portions of the back of the gasket outwardly, as indicated at 29 in Fig. 5, to a position where they will be clamped between the bolt flanges of the retaining ring sections.

On the other hand, the novel configuration of applicant's gasket and retaining ring eliminates any inward buckling of the gasket or any pinching of portions of the same when the retaining ring is assembled upon the gasket.

In the form of the invention illustrated in Figs. 7 and 8, the construction of the gasket G is exactly the same as that shown in Figs. 1 to 4, inclusive. The retaining ring R, however, is of a different construction from the ring shown in Figs. 1 and 2 in that it does not have the circular flanges 22 which engage in annular grooves 23 in the pipe sections.

While it would be desirable in many instances to build pipe lines of pipes formed of light gauge material, it has not been found practical since the thinness of the pipes prohibits providing the same with the annular grooves 23, hence the pipe lines have heretofore generally been formed of heavy gauge pipe in order that the grooves may be provided therein to cooperate with the flanges on the retaining ring of the coupling to prevent separation of the pipe sections.

In Figs. 7 and 8, there is disclosed a construction such that the pipe sections will be held against separation or longitudinal movement, but will be free to expand or contract under temperature changes and which is entirely suitable for use upon pipe lines employing light gauge pipes. The retaining ring R is provided internally and adjacent its opposite ends with annular grooves 30, while the pipe sections have arcuately extending outwardly pressed portions 31 which engage in the grooves 30 of the retaining ring. Of course, if desired, the outwardly pressed portions 31 in the pipes could be extended entirely around the pipe and engage the annular grooves throughout. However, it is proposed to have the portions 31 circumferentially spaced from each other and extending through a short arc.

It will likewise be understood that, in place of the annular grooves 30 in the retaining ring, a plurality of arcuate grooves might be formed therein which would register with the portions 31. Since the base of the grooves 30 is curved transversely, it will be seen that movement of the pipe sections in a longitudinal direction will act to cause the retaining ring to more tightly engage with the pipe sections and with the portions 31 thereof. However, the curvature of the base of the grooves is on so large a radius that the expansion and contraction of the pipe sections, because of temperature changes, can occur before the binding action takes place between the retaining ring and the portions 31.

The form of the invention disclosed in Figs. 9, 10, 11 and 12 differs from that shown in Figs. 7 and 8 in that the pipe sections P are not provided with the portions 31, but a separate split locking ring 32 acts as the clamping medium between the retaining ring and the pipe sections. The split locking ring 32 surrounds the pipe sections and extends into the grooves 30 in the retaining ring, the inner circumference of the locking ring being provided with angularly disposed teeth or sharp edges 33 which engage or dig into the pipe sections P. The outer circumference of the clamping or locking ring 32 is transversely curved to the end that the transversely curved bottom of the grooves 30 and the outer circumference of the locking rings 32 cooperate when the pipe sections tend to separate or move longitudinally to produce a jamming or camming action between the locking ring 31 and the retaining ring R which cause the locking rings to more tightly grip the pipe sections and thus prevent separation or longitudinal movement of the pipe sections. Of course, the curvatures of the parts, just referred to, are on such radii that the pipe sections can have limited movement relative to the retaining ring R and will be free to expand and contract under temperature changes.

It will be understood that when the pipe coupling is mounted upon the ends of adjacent pipe sections, the interior of the gasket will be in communication with the pipe line and subject to the pressure therein. The internal pressure in the gasket acts to move the flanges 15 thereof into tight engagement with the pipe sections and to thus provide an efficient seal between said sections.

Although several forms of the invention have been illustrated and described herein, it should be understood that the invention is susceptible of various modifications and adaptations as fall within the scope of the appended claims.

Having thus described my invention, I claim:

1. In a pipe coupling, a leak preventing gasket comprising a flexible ring substantially U-shape in cross-section and having flanges extending inwardly of the ring from its opposite edges and toward each other, and members externally embracing said ring and united thereto at diametrically opposite points and formed of different material from said ring, said members being provided with laterally extending ribs.

2. In a pipe coupling, in combination, a leak preventing gasket comprising a flexible ring substantially U-shape in cross-section and having flanges extending inwardly of the ring from its opposite edges and toward each other, members externally embracing said ring and united thereto at diametrically opposite points and formed of different material from said ring, said members being provided with laterally extending ribs, and a retaining ring for said gasket having portions cooperating with said ribs to hold said gasket against movement relative to said retaining ring.

HOWARD F. JOHNSON.